(12) United States Patent
Zhao et al.

(10) Patent No.: US 11,190,347 B2
(45) Date of Patent: Nov. 30, 2021

(54) METHOD AND DEVICE FOR ALLOCATING QKD NETWORK RESOURCES AND COMPUTER-READABLE STORAGE MEDIUM THEREOF

(71) Applicant: Beijing University of Posts and Telecommunications, Beijing (CN)

(72) Inventors: Yongli Zhao, Beijing (CN); Xiang Liu, Beijing (CN); Xiaosong Yu, Beijing (CN); Yajie Li, Beijing (CN); Jie Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 155 days.

(21) Appl. No.: 16/732,539

(22) Filed: Jan. 2, 2020

(65) Prior Publication Data

US 2020/0358606 A1  Nov. 12, 2020

(30) Foreign Application Priority Data

May 8, 2019 (CN) .......................... 201910380704.9

(51) Int. Cl.
*H04L 9/08* (2006.01)
(52) U.S. Cl.
CPC ................. *H04L 9/0852* (2013.01)

(58) Field of Classification Search
CPC ............................... H04L 9/0852; H04L 9/12
See application file for complete search history.

(56) References Cited

U.S. PATENT DOCUMENTS

| | | | |
|---|---|---|---|
| 7,706,535 B1 * | 4/2010 | Pearson | H04L 9/0855 380/255 |
| 11,072,356 B2 * | 7/2021 | Mong | B61L 23/005 |
| 2007/0114751 A1 * | 5/2007 | Trifonov | H04L 9/0858 280/277 |
| 2017/0237558 A1 * | 8/2017 | Yuan | H04L 9/12 380/279 |
| 2019/0260581 A1 * | 8/2019 | Su | H04L 9/0838 |

* cited by examiner

*Primary Examiner* — Baotran N To
(74) *Attorney, Agent, or Firm* — Westbridge IP LLC (57) ABSTRACT

Disclosed is a method for allocating QKD network resources, which includes the following steps: obtaining a network structure of a QKD network, and constructing a key topology according to distributions condition of quantum key resources in the QKD network; in response to arrival of a service requiring encryption, judging whether the encrypted service is delay sensitive; when the service is delay sensitive, distributing quantum key resources to the service according to the key topology of the QKD network; and when the service is not delay sensitive, distributing quantum key resources to the service according to the network structure of the QKD network. Moreover, the present disclosure also provides a device for allocating QKD network resources and a non-transitory computer-readable storage medium.

16 Claims, 5 Drawing Sheets

METHOD AND DEVICE FOR ALLOCATING QKD NETWORK RESOURCES AND COMPUTER-READABLE STORAGE MEDIUM THEREOF

CROSS-REFERENCE TO RELATED APPLICATIONS

The application claims priority of Chinese patent application CN201910380704.9, filed on May 8, 2019, the entire contents of which are incorporated herein by reference.

TECHNICAL FIELD

The disclosure relates to communication technology, in particular to a method and a device for allocating quantum key distribution (QKD) network resources and also a non-transitory computer-readable storage medium.

BACKGROUND

In order to guarantee the safety of data transmission in the optical networks, now optical networks may utilize QKD technology to distribute keys for the data services. And quantum keys used by a pair of remote nodes may also be distributed and relayed by multiple groups of point-to-point QKD systems. While distributing the quantum keys by multiple groups of point-to-point QKD systems, a number of encryption/decryption operations on the quantum keys allocated may be needed, which may consume a certain period of time. Thus, a certain time delay may occur in the current key distribution process.

However, some services that requires encryption transmitted in the QKD network are delay-sensitive services, such as high-frequency information relating to the stock market, encrypted instant messages, and so on. But, in conventional QKD networks, the keys for different types of services may be transmitted through a same pre-determined quantum key distribution route. And only after a key between a source node and a destination node is determined, the source node may encrypt the service with the key and transmit the service to the destination node. And then the destination node would decrypt the service. While in the transmission of the key, a large delay may be caused by multiple times of encrypting and decrypting while relaying the key among the nodes due to the long physical distance between the source node and the destination node. And the delay would not meet the requirements of the services which are delay sensitive.

SUMMARY

Examples of the present disclosure provide a method for allocating QKD network resources, which can meet the requirements of different services that require encryption and increase the utilization rate of network resources.

According to examples of the present disclosure, the method for allocating QKD network resources may include:

obtaining a network structure of a QKD network;

constructing a key topology according to distributions of quantum key resources in the QKD network;

in response to arrival of a service requiring encryption, determining whether the service is delay sensitive or not;

when the service is delay sensitive, distributing quantum key resources to the service according to the key topology; and when the service is not delay sensitive, distributing quantum key resources to the service according to the network structure of the QKD network.

According to examples of the present disclosure, the nodes in the network structure represent quantum nodes in the QKD network; the lines among the nodes in the network structure represent physical connections among the quantum nodes in the QKD network.

According to examples of the present disclosure, the nodes in the key topology represent quantum nodes in the QKD network; and a line between any two of the nodes in the key topology represent that a shared key pair exists between the quantum nodes in the QKD network.

According to examples of the present disclosure, the method may further include the following steps before the service arrives:

taking any two quantum nodes in the QKD network as a node pair to form at least one node pair of the QKD network;

calculating all paths between each node pair according to the network structure to form a network structure path set of each node pair; and calculating all paths between each node pair according to the key topology to form a key topology path set of each node pair.

According to examples of the present disclosure, determining whether the service is delay sensitive or not may include the following steps:

detecting whether a delay tolerance parameter is set or not for the service; wherein, the delay tolerance parameter represents the number of encryptions/decryptions that is accepted by the service;

when a delay tolerance parameter is set for the service, determining that the service is delay sensitive; and when a delay tolerance parameter is not set for the service, determining that the service is not delay sensitive.

According to examples of the present disclosure, distributing quantum key resources to the service according to the key topology may include the following steps:

obtaining the node pair of the source node and the destination node of the service, and the delay tolerance parameter of the service;

selecting at least one path satisfying the delay tolerance parameter from the key topology path set of the node pair; and distributing the quantum key resources to the service through the at least one path selected.

According to examples of the present disclosure, selecting at least one path satisfying the delay tolerance parameter from the key topology path set of node pair may include the following steps:

obtaining at least one path with relay hops less than the delay tolerance parameter from the key topology path set of the node pair, and selecting the at least one path from the at least one path according to the K-shortest path algorithm.

According to examples of the present disclosure, distributing quantum key resources to the service according to the network structure of the QKD network may include:

obtaining the node pair of the source node and the destination node of the service;

selecting at least one path from the network structure path set of the node pair according to the K-shortest path algorithm; and distributing the quantum key resources to the service through the at least one path selected.

According to examples of the present disclosure, the method may further include:

after distributing the quantum key resources to the service, selecting at least one path from the network structure path set of the node pair according to the FF algorithm; and distributing wavelength resources to the service through the at least one path selected.

According to examples of the present disclosure, the method may further include:

determining whether the wavelength resources allocated meets the requirements of the service;

when the wavelength resources allocated does not meet the requirements of the service, blocking the service is blocked, and when the wavelength resources allocated meets the requirements of the service, locking the wavelength resources allocated to the service.

According to examples of the present disclosure, locking the wavelength resources allocated to the service comprises: selecting and locking wavelength resources to be occupied in the set of links in the network structure of the QKD network.

According to examples of the present disclosure, the method may further include:

determining whether the amount of the quantum key resources allocated meets the requirements of the service;

when the amount of the quantum key resource allocated does not meet the requirements of the service, blocking the service is blocked and discarding the service, and when the amount of the quantum key resource allocated meets the requirements of the service, locking the quantum key resources allocated to the service.

According to examples of the present disclosure, locking the quantum key resources allocated to the service comprises: selecting and locking key slot resources in the virtual quantum key pool to be occupied by the service.

Examples of the present disclosure also provide a device for allocating QKD network resources, which can be used to realize the above method for allocating the QKD network resources. The device may include:

a topology acquisition module, configured to acquire the network structure of a QKD network and construct a key topology according to distributions of quantum key resources in the QKD network;

a service judgment module, configured to determine, in response to arrival of a service requiring encryption, whether the service is delay sensitive or not;

a first distribution module, configured to distribute quantum key resources to the service according to the key topology when the service is delay sensitive; and a second distribution module, configured to distribute quantum key resources to the service according to the network structure when the service is not delay sensitive.

As can be seen from the above description, the method and the device for allocating QKD network resources provided by examples of the present disclosure can obtain the network structure and construct a key topology according to the distributions of the quantum key resources in the QKD network, thus the quantum key resources distribution for delay-sensitive services according to the key topology and the quantum key resources distribution for delay-insensitive services according to the network structure can be carried out. Therefore, services with multiple delay requirements can be flexibly processed. And limited quantum key resources of the QKD network can be utilized efficiently.

DETAILED DESCRIPTION OF THE EMBODIMENTS

Descriptions of the present disclosure will be rendered by reference to specific examples which are illustrated in the appended drawings.

Figure 1:
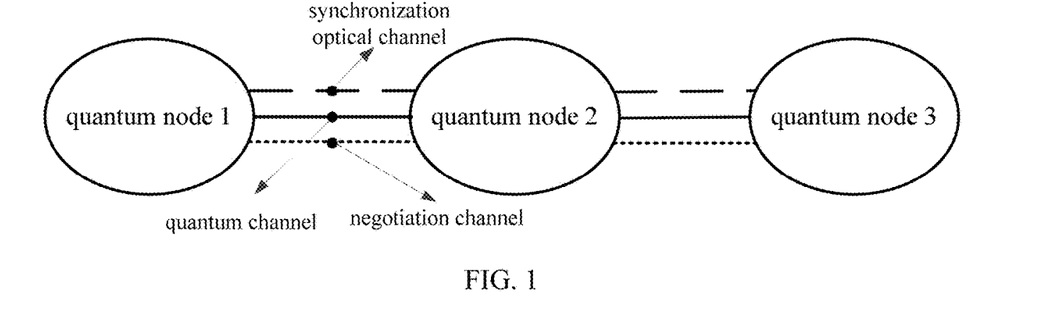
FIG. 1 is a schematic diagram illustrating a communication process of a quantum network.

FIG. 1 is a schematic diagram illustrating a communication process of a quantum network. According to FIG. 1, the quantum network may include a plurality of quantum nodes and a plurality of links. Wherein, the quantum nodes may be configured to implement functions such as receiving, transmitting and storing. And channels in the links may be divided into synchronization optical channels, quantum channels and negotiation channels. The synchronization optical channel may be used for transmitting a periodic optical signal to assist the synchronization process. The quantum channel may be used for transmitting quantum optical signals. And the negotiation channel may be used for transmitting negotiation information such as basis vector comparison information, bit error information, verification information and the like. Assuming that a key service is to be transmitted from the quantum node 1 to the quantum node 3, in this case, an encryption may be first performed at the quantum node 1 to form a key service including a synchronization optical signal, a quantum signal and a negotiation signal, and then the key service may be transmitted to the quantum node 2 through three channels respectively. After receiving the key, the quantum node 2 may first decrypt the key service. And the same encryption process may be performed at the quantum node 2 as that of the quantum node 1. Then the quantum node 2 may further transmit the key service to the quantum node 3. And finally, the quantum node 3 may decrypt the key service.

It can be seen that two encryption/decryption operations on the quantum keys allocated are performed, which may consume a certain period of time. Thus, a certain time delay may occur in the current key distribution process. And this delay may not meet the requirements of the services.

Figure 2:
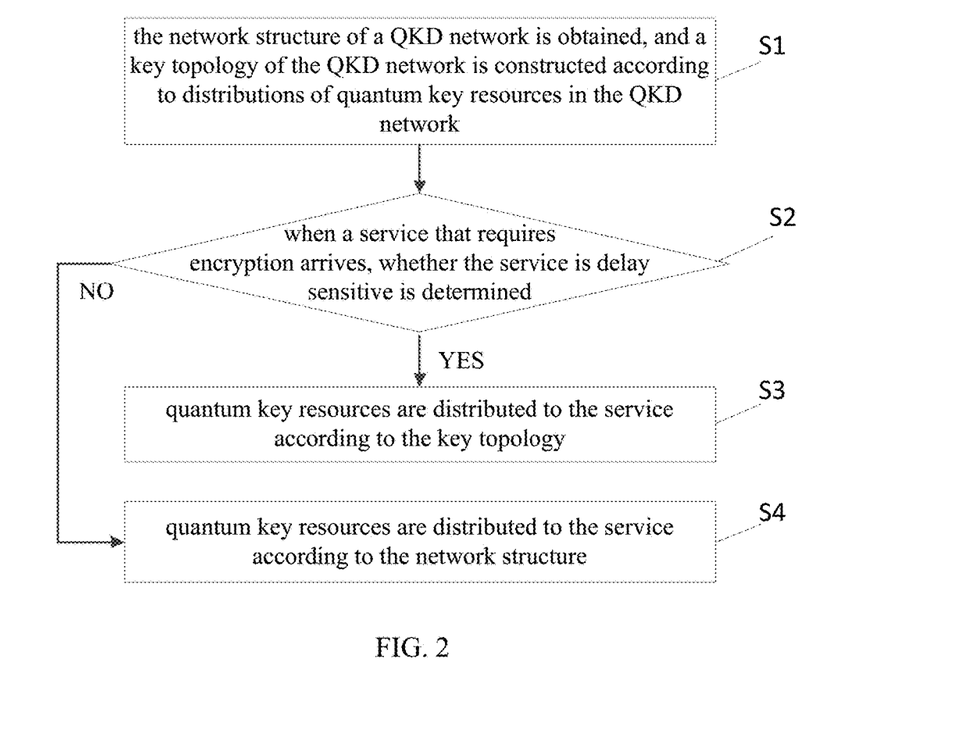
FIG. 2 is a flow diagram illustrating a method for allocating QKD network resources according to some examples of the present disclosure.

FIG. 2 is a flow diagram illustrating a method for allocating QKD network resources according to some examples of the present disclosure. According to FIG. 2, the method for allocating QKD network resources may include:

In S1, the network structure of a QKD network is obtained, and a key topology of the QKD network is constructed according to distributions of quantum key resources in the QKD network.

According to examples of the present disclosure, the network structure generally represents an actual linking status of network nodes, i.e. nodes, links, and etc. The nodes in the network structure represent quantum nodes in the QKD network, and the lines among the nodes in the network structure represent physical connections among the quantum nodes. And in the QKD network, virtual quantum key resources may be pre-configured in some remote node pairs to avoid quantum key relays between a remote node pair. That is, a virtual quantum key pool would be pre-configured for each remote node pair. In the virtual quantum key pool, quantum key resources pre-configured for the remote node pair are stored. Therefore, when distributing quantum key resources within the whole network, it would be difficult to represent the distributions of quantum key resources only relaying on the network structure of the QKD network.

In order to represent the distributions of quantum key resources in a QKD network directly and accurately, a key topology of the QKD network is defined. As quantum keys in the QKD network always appear in pairs and are held together by a network node pair. Moreover, the quantum keys are virtualized as virtual quantum key pools in the QKD network. In this case, the nodes in the key topology represent quantum nodes of the QKD network, and a line connecting a node pair represents a virtual quantum key pool of the node pair, wherein the line does not represent a physical connection, nor a spatial distance, but represents that shared key pairs exist between the two nodes of the node pair. The attributes of the line may include the number of quantum keys pre-configured and the number of hops between two nodes in the network.

Figure 3:
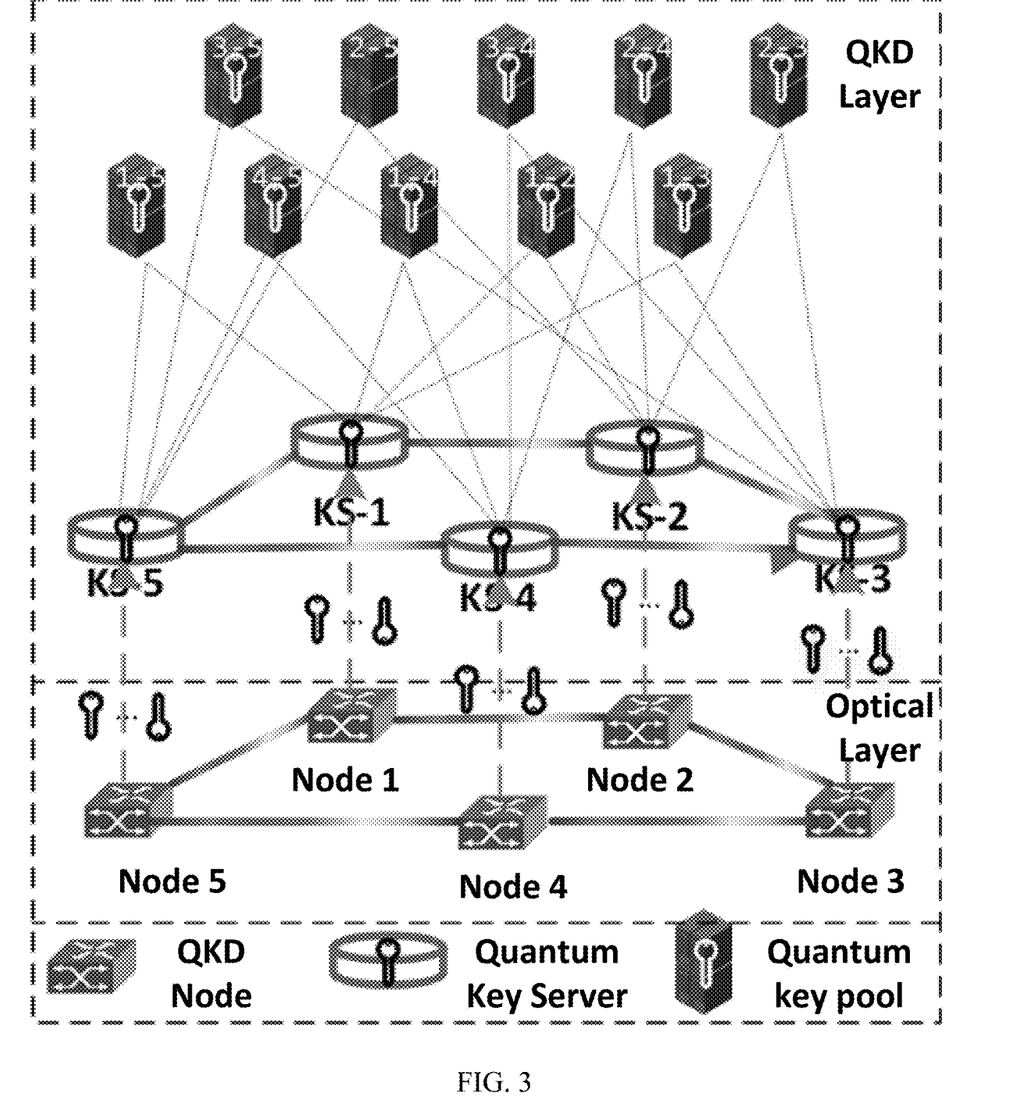
FIG. 3 is a diagram illustrating the architecture of a QKD network with five nodes according to some examples of the present disclosure.
Figure 4:
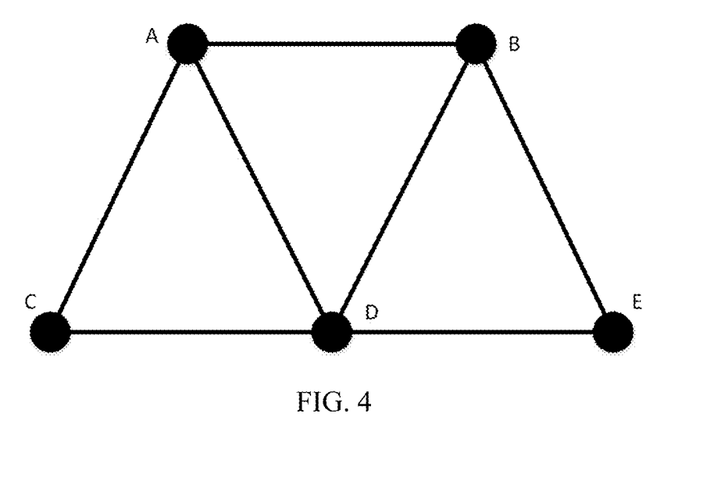
FIG. 4 is a diagram illustrating the network structure of a QKD network according to some examples of the present disclosure.
Figure 5:
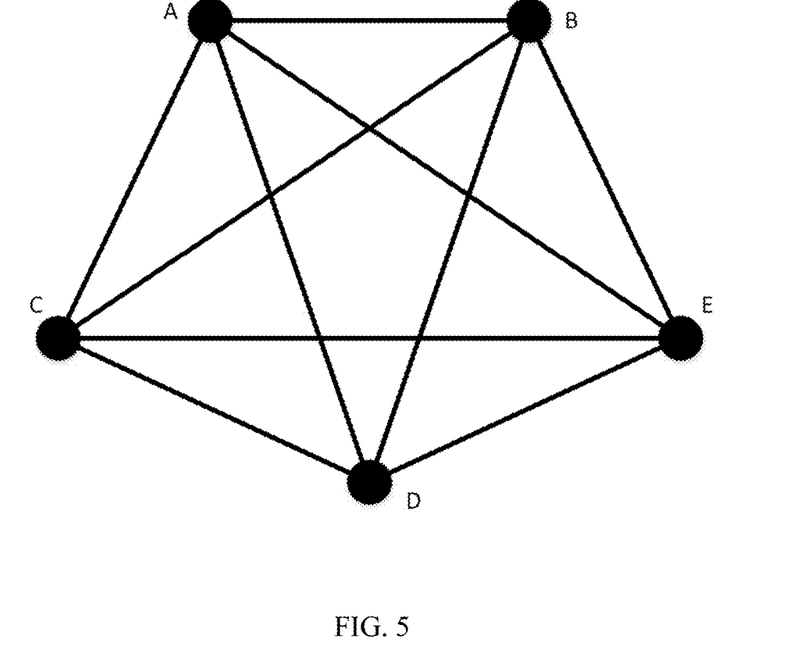
FIG. 5 is a diagram illustrating the key topology of a QKD network according to some examples of the present disclosure.

For example, FIG. 3 is a diagram illustrating the architecture of a QKD network with five nodes, in which a quantum key distribution can be performed between any two nodes. If there is no advanced deployment of quantum key resources, the key topology may be consistent with the network structure of QKD network. However, actually there would be enough quantum key resources deployed in advance through relaying between any two nodes in the QKD network, and the virtual quantum key pool is shown as the QKD layer in FIG. 3, therefore the network structure of the QKD network would be shown as FIG. 4, and the key topology of the QKD network would be shown as FIG. 5.

In S2, in response to arrival of a service requiring encryption, whether the service is delay sensitive or not would be determined; and when the service is delay sensitive, proceed to S3, and when the service is not delay sensitive, proceed to S4.

According to examples of the present disclosure, there would be two types of services that require encryption. One is delay-sensitive services, such as high-frequency information relating to the stock market, encrypted instant messages and the like. And the delay tolerance (DT) of this kind of services is low. The other type of services is delay-insensitive services, such as encrypted file transmission, encrypted information distribution, encrypted data migration and so on. And the DT of this kind of services is relatively high.

Specifically, S2 may include the following steps: in response to arrival of the service, detecting whether of a DT parameter is set for the service or not; wherein, the DT parameter represents the number of encryption/decryption operations accepted by the service.

When a DT parameter is set for the service, determining that the service is delay sensitive.

When a DT parameter is not set for the service, determining that the service is not delay sensitive.

It should be noted that for the delay-sensitive services a parameter can be set. Here, the DT of a service may indicate the tolerance on delay of the service, i.e. how many times of encryption/decryption operations performed by the relay nodes that the service can tolerate. The smaller the DT indicates the higher the requirements on the delay of the service.

According to examples of the present disclosure, before S2, the method may further include:

taking any two quantum nodes in the QKD network as a node pair to form at least one node pair;

calculating all paths between each node pair according to the network structure to form a network structure path set of each node pair; and calculating all paths between each node pair according to the key topology to form a key topology path set of each node pair.

Note that in examples of the present disclosure, the number of hops between the node pair of the source node and the destination node would be taken as an evaluation criterion for the paths in the network structure and in the key topology. According to the k-shortest paths (KSP) algorithm, all the paths between the nodes of each node pair in the network structure would be calculated in advance. And all the paths between the nodes of each node pair may be sorted from small to large according to the number of hops, and the sorting result would be stored as the network structure path set in the corresponding nodes of the node pair. And when allocating quantum key resources, the node may select a path from the network structure path set stored in itself. In the same way, all the paths between the nodes of each node pair in the key topology would be calculated in advance according to the KSP algorithm. And all the paths between the nodes of each node pair would be sorted from small to large according to the number of hops, and the sorting result would be stored as a key topology path set in the corresponding nodes of the node pair. And when allocating quantum key resources, the node may select at least one path from the key topology path set stored in itself.

In S3, quantum key resources are distributed to the service according to the key topology.

According to examples of the present disclosure, the quantum key resources of a delay-sensitive service should not be carried by a path that has multiple relays. That is because excessive delays may be added every time the quantum key is encrypted and decrypted by a relay node. And this delay would not meet the requirements of this type of service. A best way to distribute quantum key resources is to transmit the quantum key resources without any encryption or decryption operation of the relay node. That is, a lowest delay of a service would be obtained when only one encryption operation is performed at the source node and only one decryption operation is performed at the destination node. Therefore, for the delay-sensitive services, the quantum key resources stored in the virtual quantum key pool of a node pair should be used.

Specifically, S3 may include the following steps:

obtaining the node pair of the source node and the destination node, and the DT parameter of the service;

selecting at least one path satisfying the DT parameter from the key topology path set of the node pair; and distributing the quantum key resources to the service through the at least one path selected.

According to examples of the present disclosure, selecting at least one path satisfying the DT parameter from the key topology path set of node pair may include the following steps:

obtaining at least one path with the number of hops of relays less than the DT parameter from the key topology path set of the node pair; and selecting one or more paths from the at least one path according to the K-shortest path algorithm.

It should be noted that the DT in a key topology is used to represent the delay requirements of a service, and the DT in a QKD network can be considered as the number of hops between two nodes in the key topology. And after a delay-sensitive service that requires encryption arrives, paths of the network structure path set are traversed and selected corresponding to the node pair of the source node and the destination node. In this step, all the paths in the network structure path set corresponding to node pair of the source node and the destination node with the number of hops of relays smaller than the DT of the service would be selected. And quantum key resources required by the service would be distributed through the at least one path selected according to the k-shortest path algorithm (note that multiple paths can be selected according to the k-shortest path algorithm, and the quantum key resources distributed by the multiple paths can be accumulated).

In S4, quantum key resources are distributed to the service according to the network structure.

It should be noted that there are many alternative paths that can be selected for delay-insensitive services, and the quantum key resources of the service may even be transferred along a quantum key distribution path. In addition, under the severe condition that the number of quantum keys stored in the virtual quantum key pool of a node pair is insufficient, it is reasonable to sacrifice the delay performance to some extent while distributing key resources to delay-insensitive services.

Specifically, S4 may include the following steps:

obtaining the node pair of the source node and the destination node of the service;

selecting at least one path from the network structure path set of the node pair according to the K-shortest path algorithm; and distributing the quantum key resources to the service through the at least one path selected.

It should be noted that after the arrival of delay-insensitive services, attempts may be made to allocate sufficient quantum key resources for each service. That is, quantum key resources required by each service are allocated according to the K-shortest path algorithm from the network structure path set corresponding to the node pair of the source node and the destination node (note that multiple paths can be selected according to the k-shortest path algorithm, and the quantum key resources distributed by the multiple paths can be accumulated).

According to examples of the present disclosure, the method may further include: when detecting that the quantum key resources available cannot meet the requirements of the service, the service is determined to be blocked and then the service will be discarded.

It should be noted that when allocating quantum key resources to a service that requires encryption, if no virtual quantum key pool that meets the requirements of the service can be found, the service may be blocked. And then a next service that requires encryption may be processed.

According to examples of the present disclosure, the method may further include: after distributing the quantum key resources to the service, selecting at least one path from the network structure path set of the node pair of the source node and the destination node according to the first-fit (FF) algorithm; and distributing wavelength resources to the service through the at least one path selected. To be noted, the FF algorithm is only an option that could be used to select the path, other algorithm can be adopted in embodiments of the present disclosure.

It is to be noted that, if sufficient quantum key resources have been allocated to a service that requires encryption, wavelength resources may be allocated to the service based on the network structure. Specifically, the paths in the network structure path set corresponding to the node pair of the source node and the destination node are traversed, and wavelength resources are allocated to the service based on the FF algorithm. And if the wavelength resources allocated to the service are not sufficient, the service may be blocked, and a next service that requires encryption may be then processed.

Figure 6:
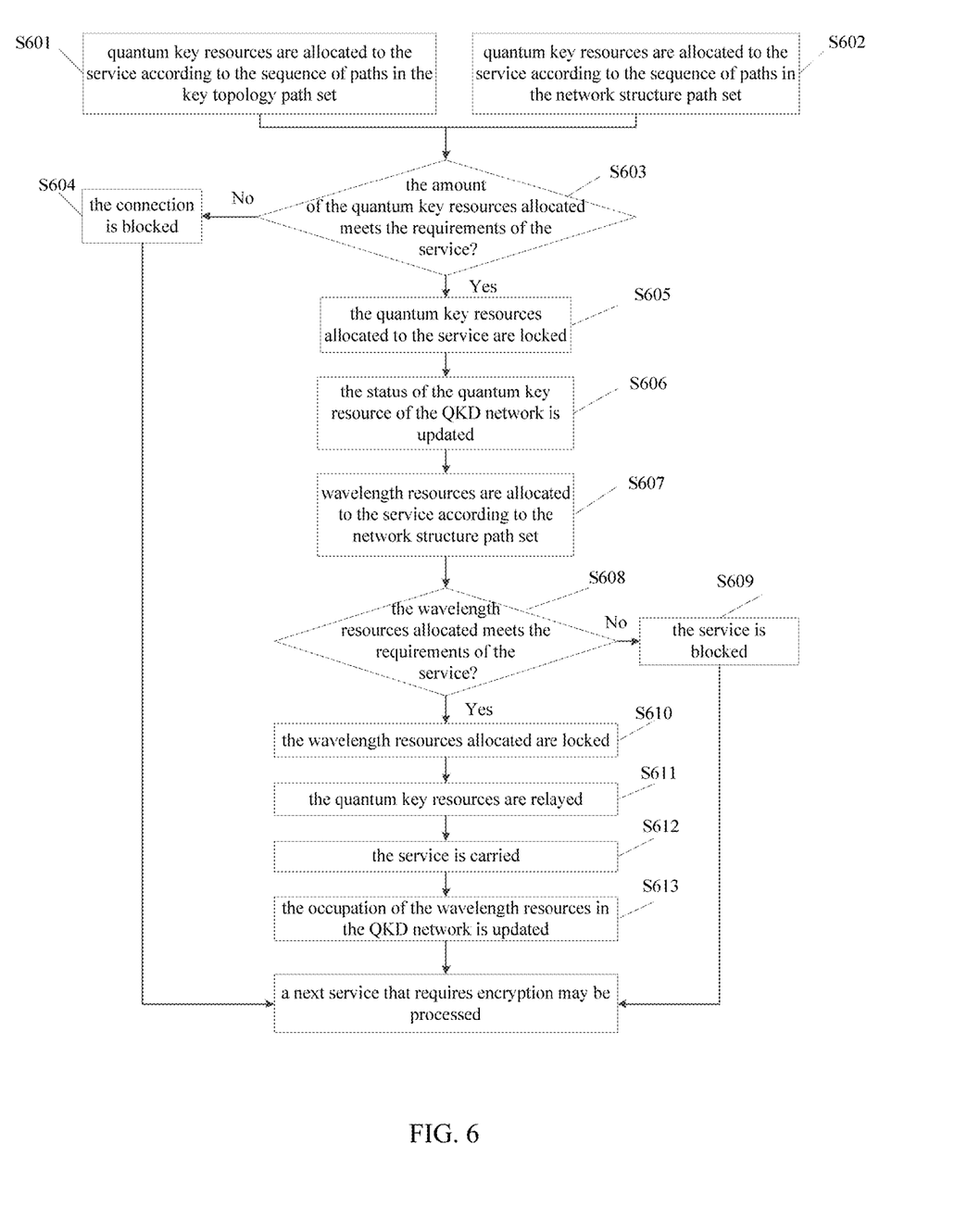
FIG. 6 is a flow diagram illustrating a method for allocating QKD network resources according to some other examples of the present disclosure.

FIG. 6 is a flow diagram illustrating the process of a method for allocating QKD network resources according to some other examples of the present disclosure. Referring to FIG. 6, the method may include:

In S601, in response to arrival of a delay-sensitive service requiring encryption, quantum key resources are allocated to the service according to the sequence of paths in the key topology path set, and then proceed to step S603.

In S602, in response to arrival of a delay-insensitive service requiring encryption, quantum key resources are allocated to the service according to the sequence of paths in the network structure path set, and then proceed to step S603.

In S603, whether the amount of the quantum key resources allocated meets the requirements of the service is determined, when the amount of the quantum key resource allocated does not meet the requirements of the service, proceed to step S604, and when the amount of the quantum key resource allocated meets the requirements of the service, proceed to step S605.

In S604, it is determined that the service does not have enough quantum key resources, the connection is blocked. And then a next service may be processed.

In S605, the quantum key resources allocated to the service are locked.

In particular, according to examples of the present disclosure, the quantum key resources in the virtual quantum key pool to be occupied by the service are selected and locked.

In S606, the status of the quantum key resource of the QKD network is updated.

In particular, according to examples of the present disclosure, the occupancy status of quantum key resources in each virtual quantum key pool of the QKD network is updated.

In S607, wavelength resources are allocated to the service according to the network structure path set.

In S608, whether the wavelength resources allocated meets the requirements of the service is determined, when the wavelength resources allocated does not meet the requirements of the service, proceed to step S609, and when the wavelength resources allocated meets the requirements of the service, proceed to step S610.

In S609, it is determined that the wavelength resources are not available for the service, and the service is blocked. Then a next service that requires encryption may be processed.

Here, according to examples of the present disclosure, when the service is blocked, the quantum key resources locked in step S605 may be released.

In S610, the wavelength resources allocated are locked.

In particular, according to examples of the present disclosure, the wavelength resources to be occupied in a set of links that are occupied in the network structure of the QKD network are selected and locked. To be noted, in the present disclosure, a link may refer to a node-to-node QKD link; while a path may refer to a path between two nodes of a remote node pair formed by at least one QKD link.

In S611, the quantum key resources are relayed by relay nodes between the node pair of the source node and the destination node.

In particular, according to examples of the present disclosure, the key resources required by the service are obtained by the node pair of the source node and the destination node by relaying.

In S612, the service is carried out utilizing the quantum key resources allocated.

In particular, according to examples of the present disclosure, the quantum key resources (a quantum key pair) allocated are used for encrypting the data service. And the encrypted data service is then transmitted to the destination node by the source node.

In S613, the occupation of the wavelength resources in the QKD network is updated. And then a next service that requires encryption may be processed.

In the following, the method for allocating QKD network resources is illustrated taking a three-node QKD network as an example.

Figure 7:
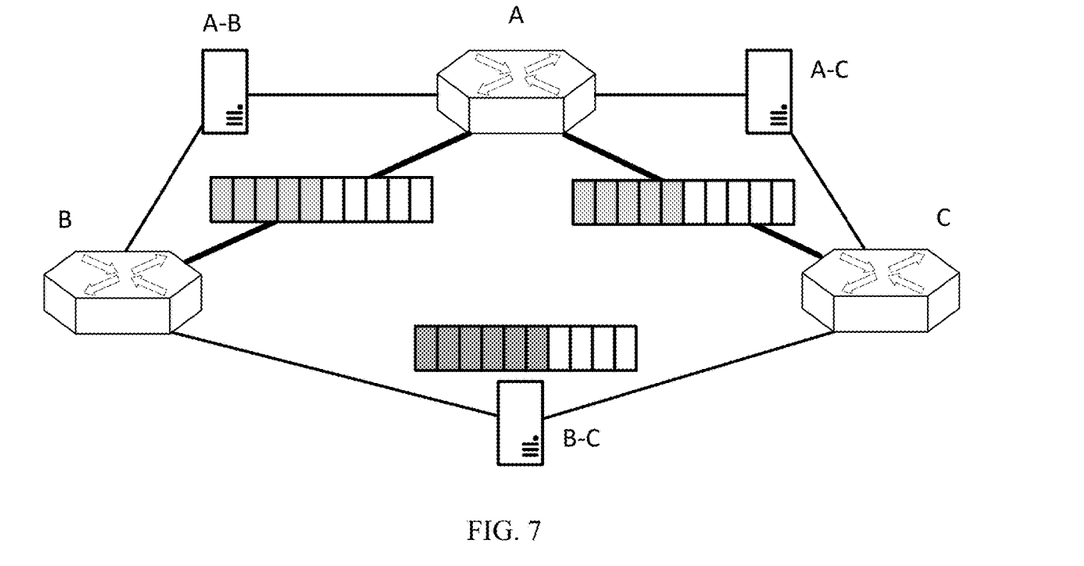
FIG. 7 is a diagram illustrating the architecture of a QKD network with three nodes according to some examples of the present disclosure.

FIG. 7 is a diagram illustrating the architecture of a QKD network with three nodes according to some examples of the present disclosure. As shown in FIG. 7, the QKD network includes two QKD subsystems. Wherein, the first QKD subsystem includes quantum node A and quantum node B, and the second QKD subsystem includes quantum node A and quantum node C. Quantum key pairs would be pre-stored in corresponding quantum node pairs such as the quantum node A and the quantum node B (hereinafter named node pair AB), and the quantum node A and the quantum node C (hereinafter named node pair AC). Moreover, QKD optical fibers between the node pair AB can generate true random number sequences (quantum key resources) for the node pair AB, and QKD optical fibers between the node pair AC can generate true random number sequences (quantum key resources) for the node pair AC. And a key management server A-B may be deployed between the node pair AB and a key management server A-C may be deployed between the node pair AC. For there are only data fibers but no QKD optical fibers between the quantum node B and the quantum node C (hereinafter named node pair BC), and there is a virtual quantum key pool between the node pair BC in which there stores quantum key resources, the quantum key resources between the node pair BC may be obtained by relaying quantum keys between the node pairs AB and AC, and a key management server B-C may be deployed to manage the status, the extraction and the injection of the quantum keys between the node pair BC. The rectangular in FIG. 7 are used to represent quantum key resources in a virtual quantum key pool, dark colors represent delay-sensitive services, and light colors represent delay-insensitive services.

When a delay-sensitive service arrives at the node pair BC, the key management server B-C is used to distribute quantum key resources from the virtual quantum key pool of the node pair BC to carry out the service. When a delay-insensitive service arrives at the node pair BC, the key management servers A-B and A-C are used to distribute quantum key resources from the virtual quantum key pool of the node pair AB and from the virtual quantum key pool of the node pair AC to carry out the service.

According to the method for allocating QKD network resources provided by the present disclosure, the network structure of the QKD network is obtained and a key topology can be constructed according to the distributions of quantum key resources in the QKD network. For delay-sensitive services, quantum key resources are distributed according to the key topology, and for delay-insensitive services, quantum key resources are distributed according to the network structure of the QKD network. In this method, services with multiple delay requirements can be processed flexibly and limited key resources of the QKD network can be utilized efficiently.

Accordingly, examples of the present disclosure also provide a device for allocating QKD network resources which can realize the processes of the above QKD network resource allocation method.

Figure 8:
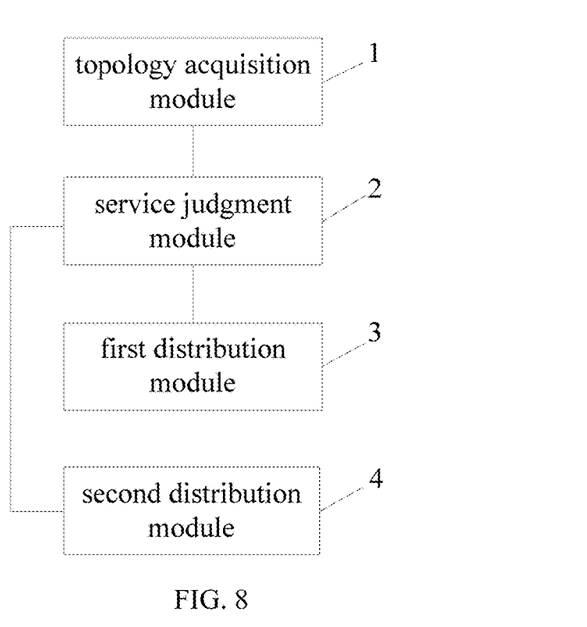
FIG. 8 is a diagram illustrating the structure of a device for allocating QKD network resources according to some examples of the present disclosure.

FIG. 8 is a diagram illustrating the structure of a device for allocating QKD network resources according to some examples of the present disclosure. Referring to FIG. 8, the device may include:

a topology acquisition module 1, configured to obtain the network structure of the QKD network and construct a key topology according to distributions of quantum key resources in the QKD network;

a service judgment module 2, configured to determine, in response to arrival of a service requiring encryption, whether the service is delay sensitive or not;

a first distribution module 3, configured to distribute quantum key resources to the service according to the key topology when the service is delay sensitive; and a second distribution module 4, configured to distribute quantum key resources to the service according to the network structure when the service is not delay sensitive.

According to the device for allocating QKD network resources provided by the present disclosure, the network structure of the QKD network is obtained and a key topology can be constructed according to the distributions of quantum key resources in the QKD network. For delay-sensitive services, quantum key resources are distributed according to the key topology, and for delay-insensitive services, quantum key resources are distributed according to the network structure. In this method, services with multiple delay requirements can be processed flexibly and limited key resources of the QKD network can be utilized efficiently.

Examples of the present disclosure also provide a device for allocating QKD network resources, which may include: one or more processors, one or more memories, and a communication bus configured to couple the one or more processors and the one or more memories; wherein the one or more memories store one or more instructions, and when executed by the one or more processors, the instructions cause the one or more processors to perform the above method for allocating QKD network resources.

Examples of the present disclosure also provide a non-transitory computer-readable storage medium, including one or more instructions, when executed by one or more processors, cause the one or more processors to perform the above method for allocating QKD network resources.

One of ordinary skill in the art will appreciate that: the discussion of any of the above examples is merely exemplary and is not intended to imply that the scope of the disclosure, including the claims, is limited to these examples; the above examples or technical features in different examples may also be combined under the idea of the invention, the steps may be implemented in any order, and there are many other variations of different aspects of the invention as described above, which are not provided in detail for the sake of brevity.

In addition, well-known power/ground connections to integrated circuit (IC) chips and other components may or may not be shown in the figures provided for simplicity of illustration and discussion and to not obscure the present invention. Furthermore, means may be shown in block diagram form in order to avoid obscuring the invention, and this also takes into account the fact that details regarding implementations of such block diagram means are highly dependent on the platform in which the invention is to be implemented (i.e., such details should be well within the purview of one skilled in the art). While specific details (e.g., circuits) have been set forth in order to describe exemplary examples of the application, it will be apparent to those skilled in the art that the application may be practiced without these specific details or with variations of these specific details. Accordingly, the description is to be regarded as illustrative in nature, and not as restrictive.

While the application has been described in conjunction with specific examples thereof, many alternatives, modifications and variations thereof will be apparent to those skilled in the art in light of the foregoing description. For example, other memory architectures (e.g., dynamic RAM (DRAM)) may use the examples discussed.

The present examples are intended to embrace all such alternatives, modifications and variances that fall within the broad scope of the appended claims. Therefore, it is intended that any omissions, modifications, equivalents, improvements and the like be included within the spirit and scope of the present invention.

What is claimed is:

1. A method for allocating quantum key distribution (QKD) network resources, comprising:
   obtaining a network structure of a QKD network;
   constructing a key topology according to distributions of quantum key resources in the QKD network;
   in response to arrival of a service requiring encryption, determining whether the service is delay sensitive;
   when the service is delay sensitive, distributing the quantum key resources to the service according to the key topology of the QKD network; and
   when the service is not delay sensitive, distributing the quantum key resources to the service according to the network structure of the QKD network.

2. The method of claim 1, wherein, nodes in the network structure represent quantum nodes in the QKD network; and lines among the nodes in the network structure represent physical connections among the corresponding quantum nodes in the QKD network.

3. The method of claim 1, wherein, nodes in the key topology represent quantum nodes in the QKD network; and a line between any two of the nodes in the key topology represent that a shared quantum key pair exists between the corresponding quantum nodes in the QKD network.

4. The method of claim 1, further comprising:
   before the service that requires encryption arrives, taking any two quantum nodes in the QKD network as a node pair to form at least one node pair;
   calculating all paths between each node pair according to the network structure to form a network structure path set of each node pair; and
   calculating all paths between each node pair according to the key topology to form a key topology path set of each node pair.

5. The method of claim 4, wherein determining whether the service is delay sensitive comprises:
   detecting whether a delay tolerance DT parameter is set for the service; wherein, the DT parameter represents a number of encryption/decryption operations which can be accepted by the service;
   when a DT parameter is set for the service, determining that the service is delay sensitive; and
   when a DT parameter is not set for the service, determining that the service is delay insensitive.

6. The method of claim 5, wherein distributing quantum key resources to the service according to the key topology of the QKD network comprises:
   obtaining the node pair of the source node and the destination node of the service, and the DT parameter of the service;
   selecting at least one path satisfying the DT parameter from the key topology path set of the node pair; and
   distributing the quantum key resources to the service through the at least one path selected.

7. The method of claim 6, wherein, selecting at least one path satisfying the DT parameter from the key topology path set of the node pair comprises:
   obtaining at least one path with a number of hops of relays less than the DT parameter from the key topology path set of the node pair; and
   selecting one or more paths from the at least one path according to a K-shortest path algorithm.

8. The method of claim 6, further comprising:
   after distributing the quantum key resources to the service, selecting at least one path from the network structure path set of the node pair according to a first-fit (FF) algorithm; and
   distributing wavelength resources to the service through the at least one path selected.

9. The method of claim 4, wherein distributing quantum key resources to the service according to the network structure of the QKD network comprises:
   obtaining the node pair of the source node and the destination node of the service;
   selecting at least one path from the network structure path set of the node pair according to a K-shortest path algorithm; and
   distributing the quantum key resources to the service through the at least one path selected.

10. The method of claim 9, further comprising:
    after distributing the quantum key resources to the service, selecting at least one path from the network structure path set of the node pair according to the FF algorithm; and
    distributing wavelength resources to the service through the at least one path selected.

11. The method of claim 10, further comprising:
    determining whether the wavelength resources allocated meets requirements of the service;
    when the wavelength resources allocated does not meet the requirements of the service, blocking the service is blocked, and
    when the wavelength resources allocated meets the requirements of the service, locking the wavelength resources allocated to the service.

12. The method of claim 11, wherein, locking the wavelength resources allocated to the service comprises: selecting and locking wavelength resources to be occupied in a set of links in the network structure of the QKD network.

13. The method of claim 1, further comprising:
determining whether an amount of the quantum key resources allocated meets requirements of the service;
when the amount of the quantum key resource allocated does not meet the requirements of the service, blocking the service is blocked and discarding the service, and
when the amount of the quantum key resource allocated meets the requirements of the service, locking the quantum key resources allocated to the service.

14. The method of claim 13, wherein, locking the quantum key resources allocated to the service comprises: selecting and locking key slot resources in a virtual quantum key pool to be occupied by the service.

15. A device for allocating QKD network resources, comprising:
one or more processors, one or more memories, and a communication bus configured to couple the one or more processors and the one or more memories;
wherein the one or more memories store one or more instructions, and when executed by the one or more processors, the instructions cause the one or more processors to perform a method for allocating quantum key distribution (QKD) network resources;
wherein, the method comprises:
obtaining a network structure of a QKD network;
constructing a key topology according to distributions of quantum key resources in the QKD network;
in response to arrival of a service requiring encryption, determining whether the service is delay sensitive;
when the service is delay sensitive, distributing the quantum key resources to the service according to the key topology of the QKD network; and
when the service is not delay sensitive, distributing the quantum key resources to the service according to the network structure of the QKD network.

16. A non-transitory computer-readable storage medium, comprising one or more instructions, when executed by one or more processors, cause the one or more processors to perform a method for allocating quantum key distribution (QKD) network resources; wherein, the method comprises:
obtaining a network structure of a QKD network;
constructing a key topology according to distributions of quantum key resources in the QKD network;
in response to arrival of a service requiring encryption, determining whether the service is delay sensitive;
when the service is delay sensitive, distributing the quantum key resources to the service according to the key topology of the QKD network; and
when the service is not delay sensitive, distributing the quantum key resources to the service according to the network structure of the QKD network.

* * * * *